US006971365B1

(12) United States Patent
Najt et al.

(10) Patent No.: US 6,971,365 B1
(45) Date of Patent: Dec. 6, 2005

(54) AUTO-IGNITION GASOLINE ENGINE COMBUSTION CHAMBER AND METHOD

(75) Inventors: Paul M. Najt, Bloomfield Hills, MI (US); Tang-Wei Kuo, Troy, MI (US); David J. Cleary, West Bloomfield, MI (US); James A. Eng, Troy, MI (US); Barry L. Brown, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/987,523

(22) Filed: Nov. 12, 2004

Related U.S. Application Data

(60) Provisional application No. 60/587,099, filed on Jul. 12, 2004.

(51) Int. Cl.[7] .................................................. F02B 5/00
(52) U.S. Cl. ....................... 123/305; 123/285; 123/260
(58) Field of Search ............................ 123/193.6, 260, 123/261, 305, 262, 285, 280

(56) References Cited

U.S. PATENT DOCUMENTS

| | | | | |
|---|---|---|---|---|
| 6,082,342 A | | 7/2000 | Duret et al. | 123/568.14 |
| 6,092,501 A | * | 7/2000 | Matayoshi et al. | 123/301 |
| 6,138,639 A | * | 10/2000 | Hiraya et al. | 123/295 |
| 6,158,409 A | * | 12/2000 | Gillespie et al. | 123/193.6 |
| 6,269,790 B1 | * | 8/2001 | Yi et al. | 123/295 |
| 6,275,828 B1 | * | 8/2001 | Lee et al. | 717/116 |
| 6,286,477 B1 | * | 9/2001 | Yang et al. | 123/276 |
| 6,386,177 B2 | | 5/2002 | Urushihara et al. | 123/299 |
| 6,494,178 B1 | * | 12/2002 | Cleary et al. | 123/276 |

FOREIGN PATENT DOCUMENTS

| | | |
|---|---|---|
| WO | WO 01/46571 | 6/2001 |
| WO | WO 01/46572 | 6/2001 |
| WO | WO 01/46573 | 6/2001 |

* cited by examiner

*Primary Examiner*—Bibhu Mohanty
(74) *Attorney, Agent, or Firm*—Kathryn A. Marra

(57) ABSTRACT

A combustion chamber for an internal combustion engine includes a closed end cylinder having an axis. A piston is reciprocable in the cylinder and includes a generally flat rim having an inner edge surrounding a recessed bowl into which the fuel is primarily injected, the bowl having a floor and a surrounding side formed by an arcuate surface connecting tangentially with the floor and extending to the rim inner edge.

A spark plug has a centerline through the spark gap and is offset to one side of the cylinder axis with the spark gap extending into the combustion chamber toward the axis. A fuel injector is offset to an opposite side of the axis with the spray tip aimed to direct a generally conical fuel spray into the piston bowl with a portion of the fuel spray passing near the spark gap. Various dimensional characteristics are disclosed.

11 Claims, 8 Drawing Sheets

AUTO-IGNITION GASOLINE ENGINE COMBUSTION CHAMBER AND METHOD

CROSS-REFERENCE TO RELATED APPLICATIONS

This application claims priority from U.S. Provisional Application 60/587,099 filed Jul. 12, 2004.

TECHNICAL FIELD

This invention relates to a combustion chamber for and methods of operating a gasoline direct injection controlled auto-ignition engine.

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air, and fuel is created and auto-ignition is initiated simultaneously from many ignition sites within the mixture during compression, resulting in very stable power output and high thermal efficiency. The combustion is highly diluted and uniformly distributed throughout the charge, so that the burned gas temperatures and hence NOx emissions are substantially lower than those of traditional spark ignition engines based on a propagating flame front and diesel engines based on an attached diffusion flame. In both spark ignition and diesel engines, the burned gas temperatures are highly heterogeneous within the mixture with very high local temperatures creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and controlled auto-ignition at part load is difficult to achieve. Methods to induce controlled auto-ignition at low and part loads include: 1) intake air heating, 2) variable compression ratio, and 3) blending gasoline with ignition promoters to create a more easily ignitable mixture than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation with unconventional valve means. The following two descriptions involve valve strategies in which a high proportion of residual combustion products from a previous combustion cycle is retained to provide the necessary conditions for auto-ignition in a highly diluted mixture. The range of engine speeds and loads in which controlled auto-ignition combustion can be achieved is greatly expanded using a conventional compression ratio.

In one instance, a four-stroke internal combustion engine is reported to provide for auto ignition by controlling the motion of the intake and exhaust valves of a combustion chamber to ensure that a fuel/air charge is mixed with combusted gases to generate conditions suitable for auto-ignition. The described engine has a mechanically cam-actuated exhaust valve that is closed earlier in the exhaust stroke than normal four-stroke engines to trap combusted gases for subsequent mixing with an intake of fuel and air mixture.

Another method is described of operating a four-stroke internal combustion engine in which combustion is achieved at least partially by an auto-ignition process. Flows of fuel/air charge and combusted gases are regulated by hydraulically controlled valve means in order to generate conditions in the combustion chamber suitable for auto-ignition operation.

The valve means used comprises an intake valve controlling the flow of fuel/air mixture into the combustion chamber from an inlet passage and an exhaust valve controlling exhaust combusted gases from the combustion chamber to an exhaust passage. The exhaust valve opens (EVO) at approximately 10 to 15 degrees before bottom dead center in the expansion stroke, and closes (EVC) during the exhaust stroke in a range of 90 to 45 degrees before top dead center. The intake valve is opened (IVO) later in the four-stroke cycle than usual in a normal four-stroke engine in the range of 45 to 90 degrees after top dead center during the intake stroke.

The early exhaust valve closing and late intake valve opening provide a negative valve overlap period (EVC–IVO) where both exhaust and intake valves are closed for trapping of combusted gas which later mixes with the inducted fuel/air charge during the intake stroke and thereby promotes the auto-ignition process. The intake valve is then closed (IVC) roughly 30 degrees after bottom dead center in the compression stroke. This is generally referred to as an exhaust re-compression valve strategy.

In another instance, there is described method of operating a four-stroke internal combustion engine, combustion is achieved at least partially by an auto-ignition process. Flows of fuel/air charge and combusted gases are regulated by hydraulically controlled valve means in order to generate conditions in the combustion chamber suitable for auto-ignition operation. The valve means used comprise an intake valve controlling flow of fuel/air mixture into the combustion chamber from an inlet passage and an exhaust valve controlling flow of exhaust combusted gases from the combustion chamber to an exhaust passage.

The exhaust valve is opened for two separate periods during the same four-stroke cycle. The first period allows combusted gases to be expelled from the combustion chamber. The second period allows combusted gases previously exhausted from the combustion chamber to be drawn back into the combustion chamber. The double opening of the exhaust valve during each four-stroke cycle creates the necessary conditions for auto-ignition in the combustion chamber. This is generally referred to as an exhaust re-breathing valve strategy.

In still another described method of operating a direct-injection gasoline four-stroke internal combustion engine, combustion is achieved at least partially by an auto-ignition process. Flows of air and combusted gases are regulated by a hydraulically controlled valve means. The fuel is delivered directly into the combustion chamber by a gasoline injector. The gasoline injector is said to inject fuel during either the intake stroke or the subsequent compression stroke in a single engine cycle.

Using either exhaust re-compression or re-breathing valve strategy in conjunction with a gasoline direct injector having multiple injection capability during a single engine cycle, we and others have demonstrated that the range of engine speeds and loads in which controlled auto-ignition combustion can be achieved is greatly expanded using a conventional compression ratio.

By comparing performance and emissions results from extensive testing, it has become clear that further fuel economy improvement is possible with a hybrid valve strategy that combines exhaust re-breathing and re-compression strategies together across the engine load range. In one case, there is described a strategy assuming the use of either fully flexible valve actuation (FFVA) or a simpler mechanical three-step with a cam phasing system. In particular, below an engine load around 200 kPa net mean effective pressure (NMEP), controlled auto-ignition combustion using exhaust re-compression strategy is recommended. Above 200 kPa NMEP and below 450 kPa NMEP, controlled auto-ignition combustion using exhaust re-breathing strategy is recommended. Above 450 kPa NMEP and below 600 kPa NMEP, spark-ignition combustion employing non-throttle load control via a variable valve timing system is recommended. Above 600 kPa NMEP, spark-ignition combustion with traditional throttled operation is recommended.

With either single or hybrid valve strategy, the steady-state performance of controlled auto-ignition combustion engine is quite insensitive to injector type, injector tip location, and, to some extent, spark ignition. It has, however, proven difficult to start the engine cold with controlled auto-ignition combustion even with the use of FFVA and spark ignition without paying special attention to the details of combustion chamber design including the piston.

Further, it is confirmed experimentally that control of the auto-ignition combustion phasing is difficult especially at light load and idle since the auto-ignition process is strongly influenced by the temperature-time history and chemical kinetics of the fuel-air mixture. Small perturbation of either intake charge or cylinder wall temperature can result in engine misfire at low engine load. In order to ensure engine operation at light load and idle without misfire, over aggressive valve strategy has been used. This results in increased pumping loss and decreased fuel economy with the controlled auto-ignition combustion engine. Thus, a method is needed at light load and idle for misfire prevention, enhanced combustion phasing control, and simultaneously reduced pumping loss.

SUMMARY OF THE INVENTION

The present invention provides a combustion chamber including a piston for a gasoline direct-injection controlled auto-ignition combustion engine. Benefits of present invention include: 1) enhanced combustion phasing control at light load and idle and during transient operation, and 2) better engine performance at light load and idle with no misfire by using less aggressive valve strategy, hence lower pumping loss.

The design employs a centrally located fuel injector, a strategically located spark plug gap and piston bowl. A gasoline direct injector having multiple injection capability during a single engine cycle is used in conjunction with the hybrid valve strategies. The first injection event delivers 10–30% of total injected fuel into the combustion chamber during the early part of the induction stroke while the second injection event delivers the remaining fuel during the later part of the compression stroke. The injection timing of each injection event and the proportion of fuel split are electronically controlled. The spray is targeted toward a spark plug that is electronically controlled for the best ignition timing. The present invention has been shown to effectively control the combustion phasing at light load and idle and to enable cold start of a controlled auto-ignition gasoline direct-injection engine using a conventional compression ratio.

Since exhaust re-compression valve strategy is the preferred valve strategy chosen for engine operation at light load and idle, the present invention focused its application using exhaust re-compression valve strategy so the transition from cold start to low or idle load is straight forward with a simple cam phaser and a change in the injection strategy.

In an exemplary embodiment, a combustion chamber includes a closed end cylinder having an inlet port and an exhaust port formed therein. Valve members are disposed in the ports for controlling the flow of air and products of combustion to and from the combustion chamber. A gasoline fuel injector having a spray tip and a spark ignition source having a spark gap communicate with the combustion chamber. The cylinder has an axis and is positioned to receive air and fuel injected directly from the fuel injector.

A piston is mounted for reciprocation in the cylinder. The piston includes a generally flat rim having an inner edge surrounding a recessed bowl into which the fuel is primarily injected. The bowl has a floor and a surrounding side formed by a curved surface connecting tangentially with the floor and extending to the rim inner edge. The spark plug has a centerline through the spark gap and is offset to one side of the cylinder axis with the spark gap extending into the combustion chamber toward the axis. The injector is offset to an opposite side of the axis with the spray tip aimed to direct a generally conical fuel spray into the piston bowl with a portion of the fuel spray passing near the spark gap. The spark plug centerline is spaced inward from the bowl side curved surface by a minimum distance in a range of 6 to 10 mm.

These and other features and advantages of the invention will be more fully understood from the following description of certain specific embodiments of the invention taken together with the accompanying drawings.

Figure 6:
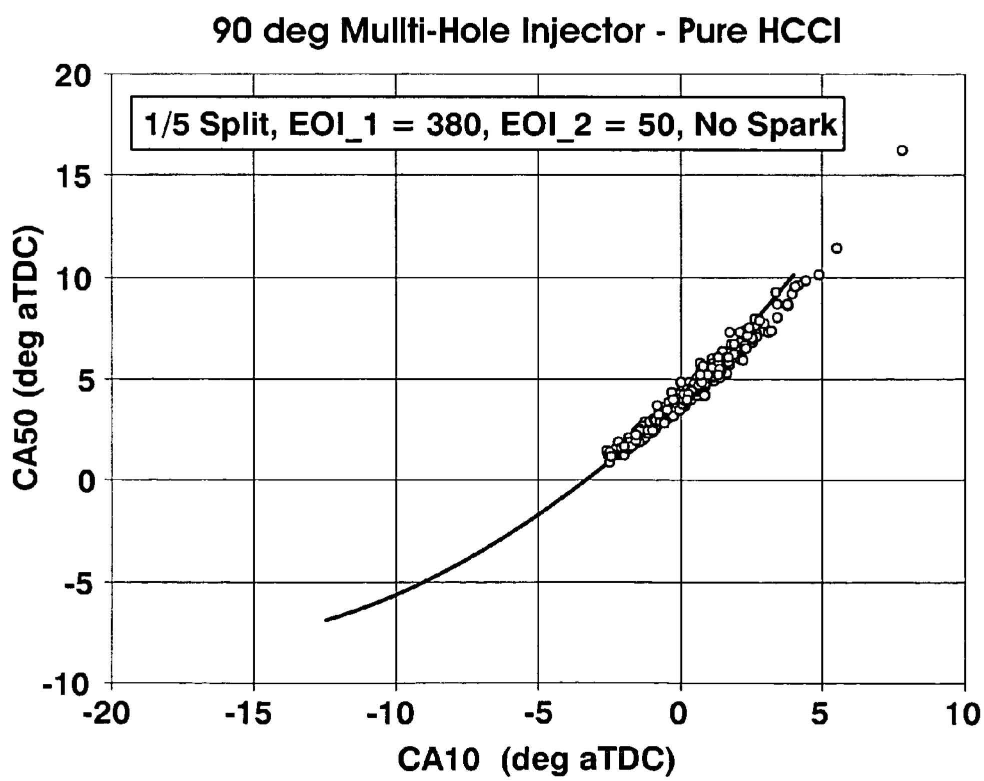
FIG. 6 is a cross plot of crank angle relationships at which the fuel charge is 10% burned (ignition timing) and 50% burned (combustion phasing) for controlled auto-ignition combustion without spark ignition using a 90 degree spray angle multi-hole injector.
Figure 7:
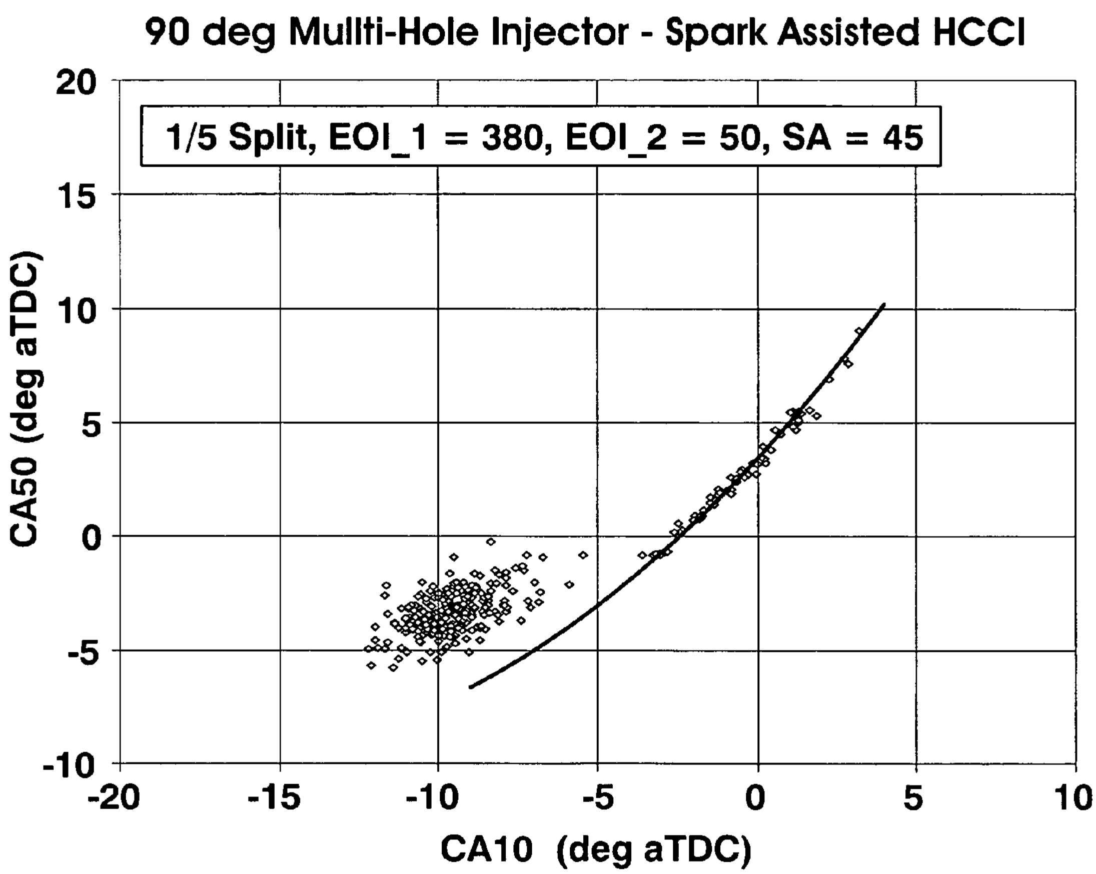
Figure 8:
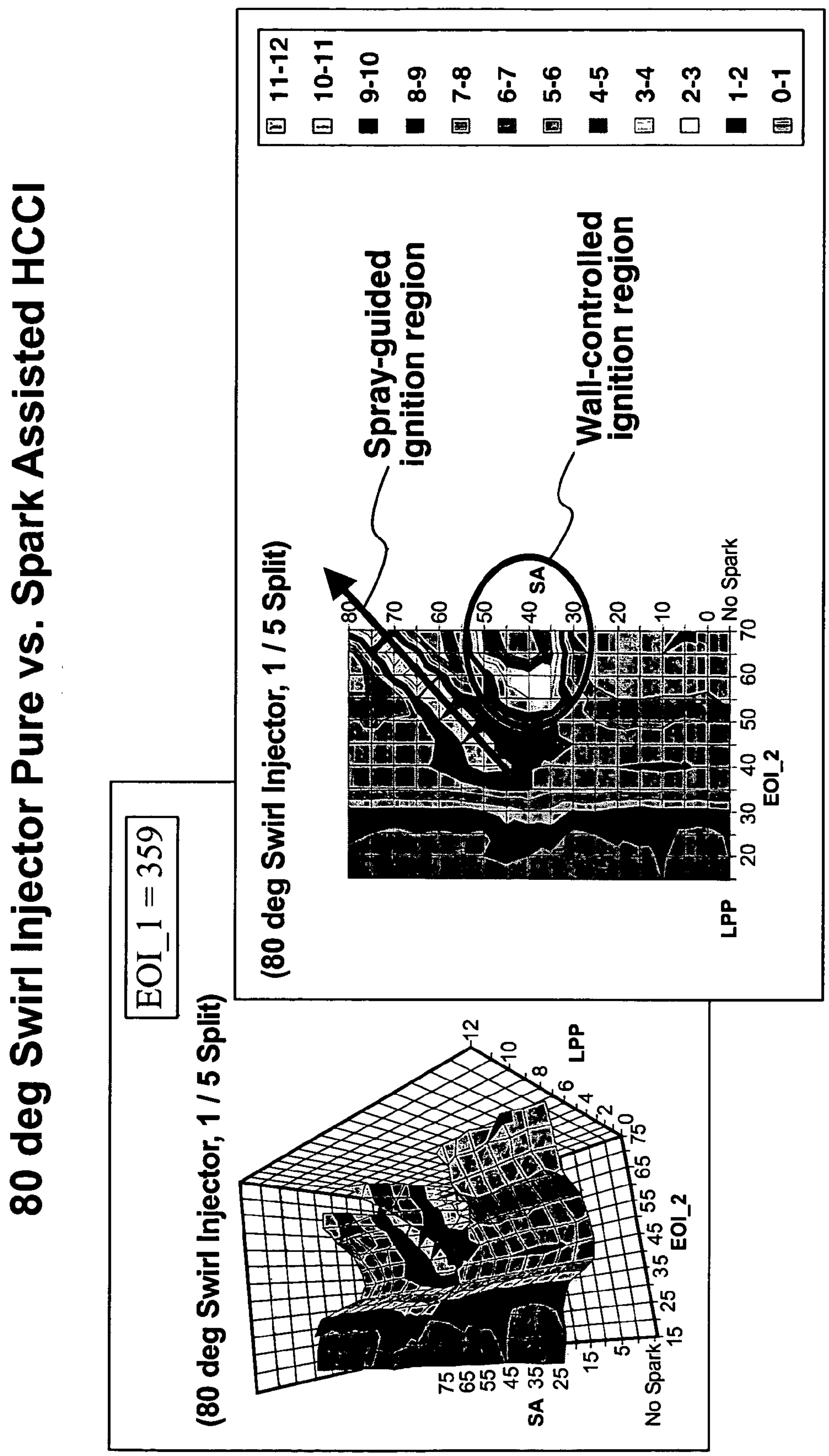
Figure 9:
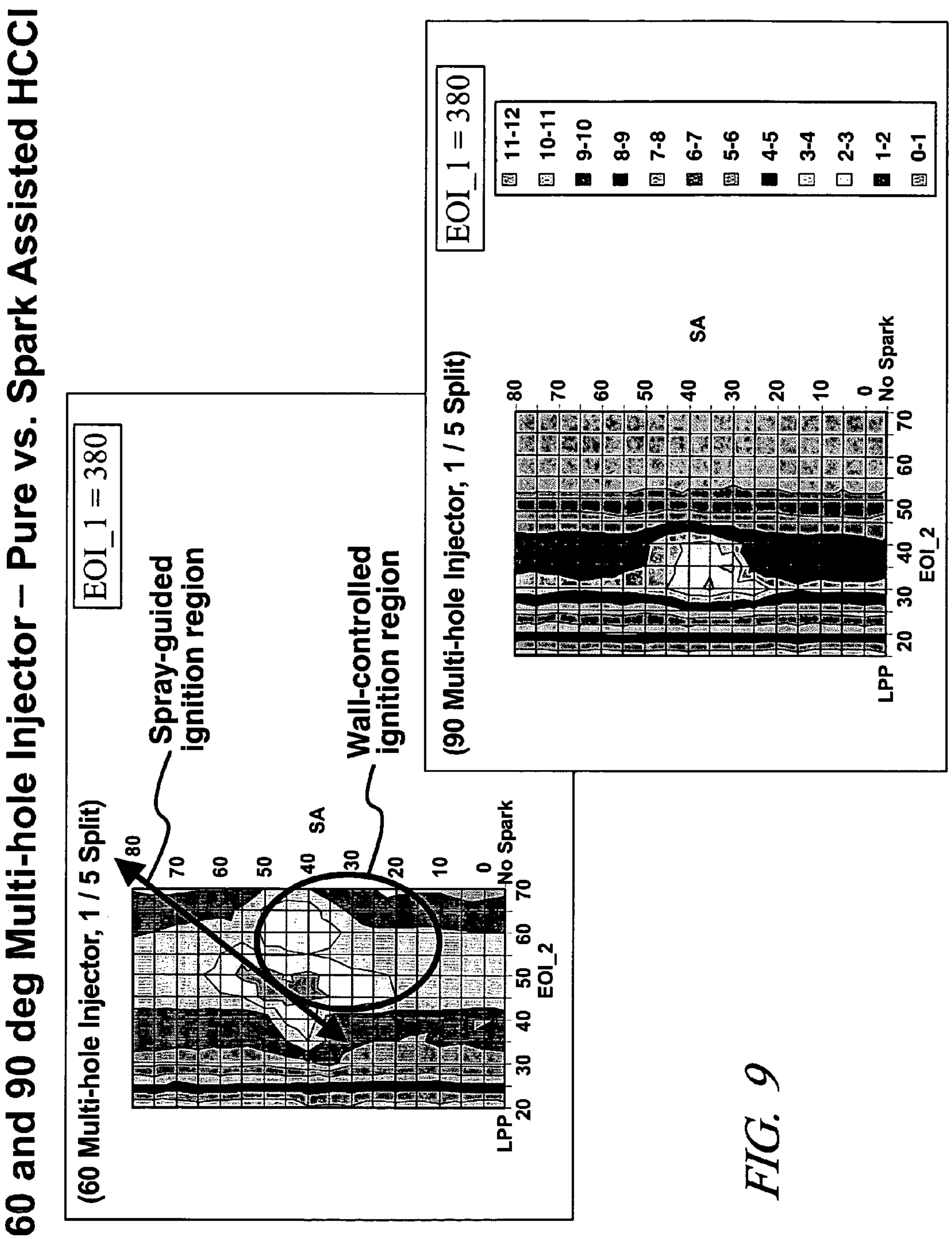
Figure 10:
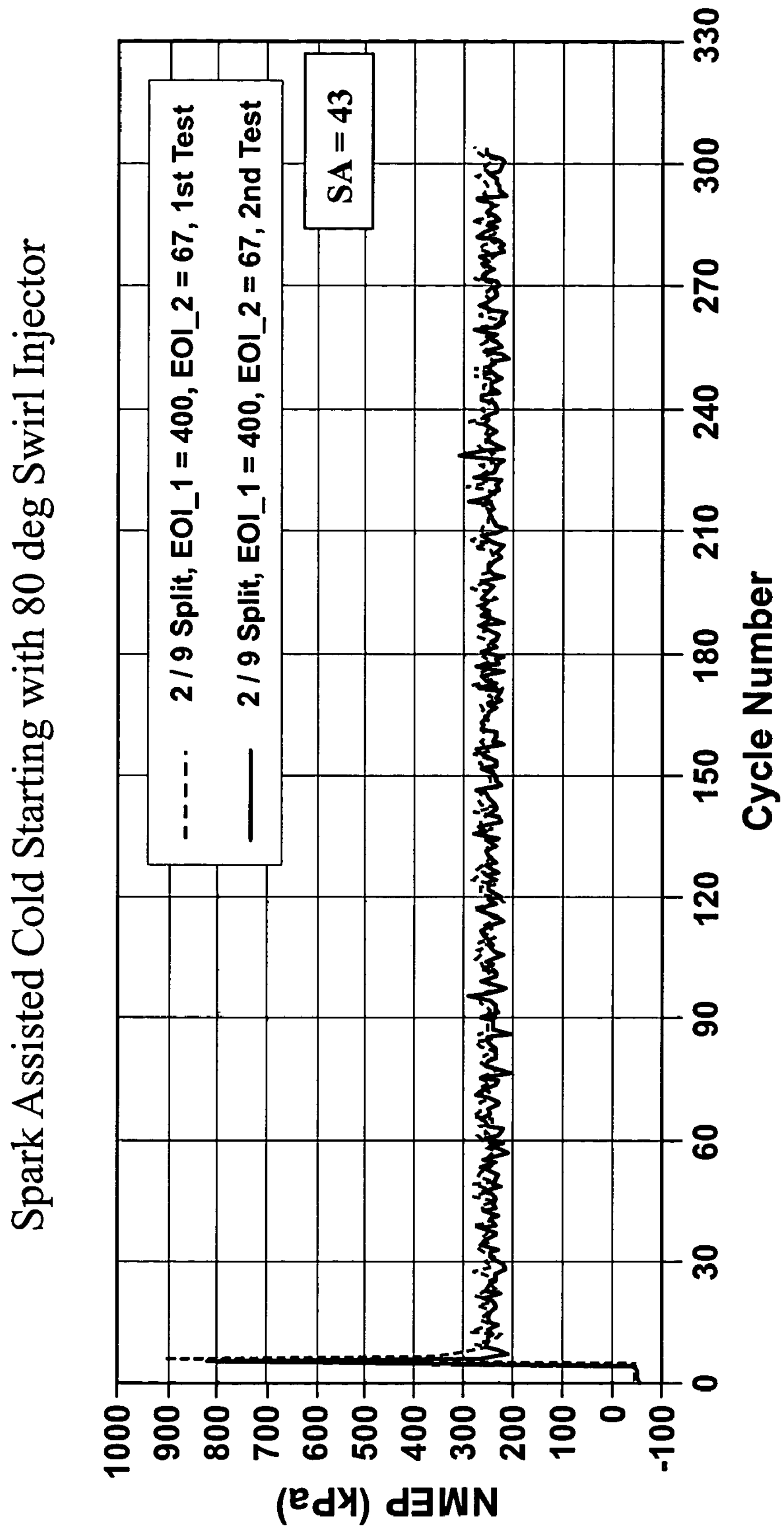

FIG. 7 is a cross plot similar to FIG. 6 but for controlled auto-ignition combustion with spark ignition;

FIG. 8 shows 3-D (perspective view) of and 2-D (top view) contour plots of the location of peak pressure (LPP) versus spark and injection timings with an 80 degree swirl injector;

FIG. 9 shows 2-D (top view) contour plots of the location of peak pressure (LPP) versus spark and injection timings with 60 and 90 degree multi-hole injectors; and FIG. 10 shows the measured net mean effective pressure (NMEP) versus the cycle number during cold start with spark ignition.

DESCRIPTION OF THE PREFERRED EMBODIMENT

Referring now to the drawings in detail, numeral 10 generally indicates a first embodiment of a single cylinder direct-injection gasoline four-stroke internal combustion engine according to the invention, although it should be appreciated that the present invention is equally applicable to a multi-cylinder direct-injection gasoline four-stroke internal combustion engine.

Figure 1:
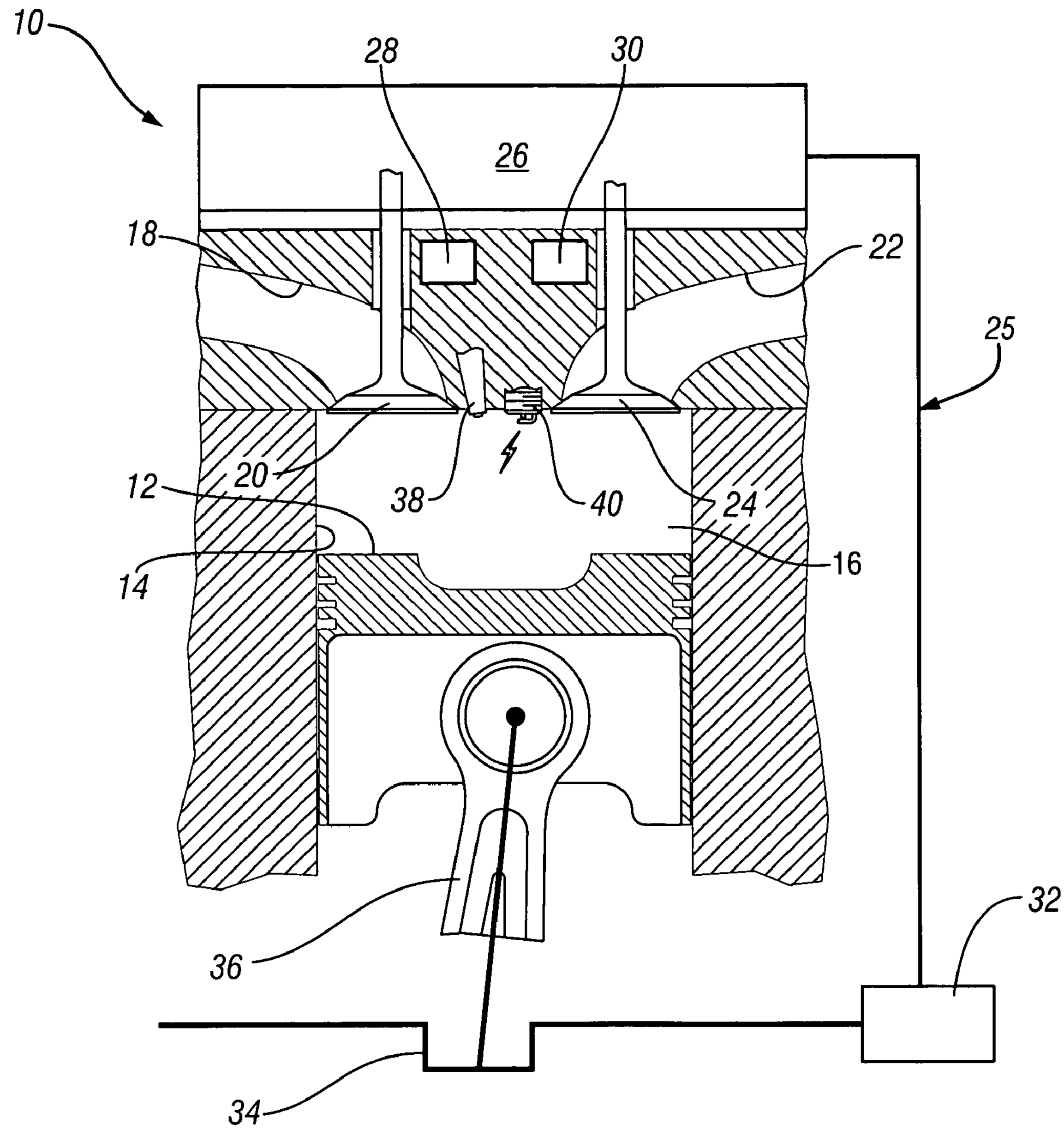
FIG. 1 is a schematic view of an exemplary embodiment of single cylinder direct-injection gasoline four-stroke internal combustion engine having a combustion system according to the present invention.

Referring to FIG. 1, a piston 12 is movable in a closed end cylinder 14 and defines with the cylinder 14 a variable volume combustion chamber 16. An intake passage or port 18 supplies air to the combustion chamber 16. The flow of air into the combustion chamber 16 is controlled by an intake valve 20. Combusted (burned) gases can flow from the combustion chamber 16 via an exhaust passage or port 22 and the flow of combusted gases through the exhaust passage 22 is controlled by an exhaust valve 24.

The engine 10 has an electro-hydraulically controlled valve train 25 including valves 20, 24 and an electronic controller 26, which is programmable and hydraulically controls the opening and closing of both the intake valve 20 and the exhaust 24. The electronic controller 26 controls the movement of the intake valve 20 and exhaust valve 24 having regard to (with feedback from) the position of the intake and exhaust valves 20 and 24 as measured by two position transducers 28 and 30. The controller 26 also has regard to the position of the piston 12 in the engine, which will be measured by a rotation sensor 32 that is connected to a crankshaft 34 of the internal combustion engine 10.

The crankshaft 34 is connected by a connecting rod 36 to the piston 12, which reciprocates in the cylinder 14. A gasoline direct injector 38, controlled by the electronic controller 26, is operable to inject fuel directly into the combustion chamber 16. A spark ignition source, such as a spark plug 40, is controlled also by the electronic controller 26 and is used to enhance the ignition timing control of the engine according to the present invention.

Figure 2:
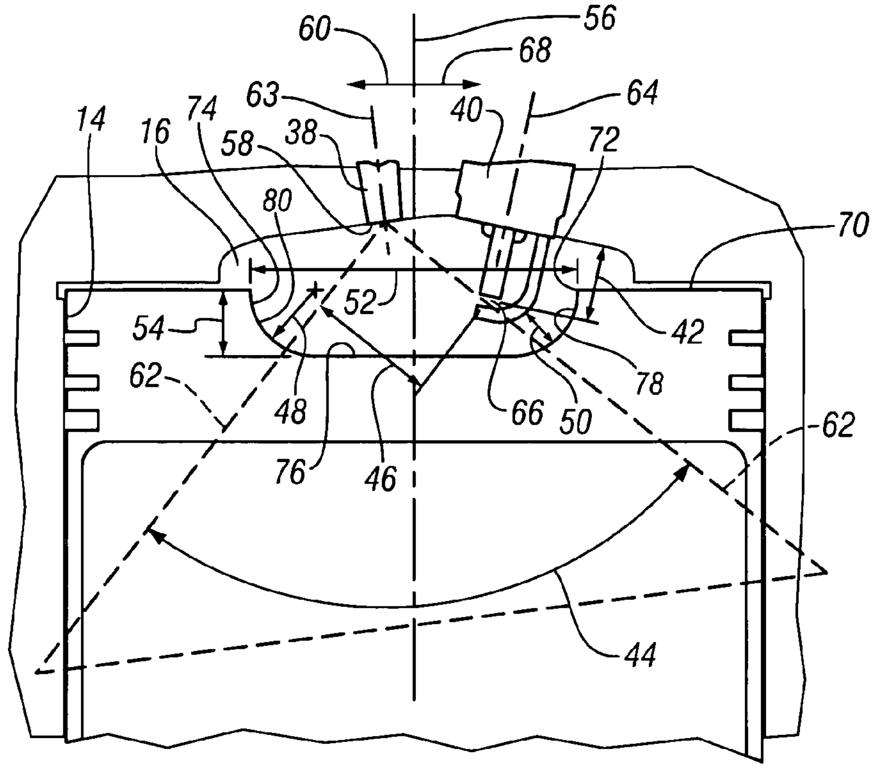
FIG. 2 is an enlarged view similar to FIG. 1 and showing combustion chamber relationships.

Referring now to FIG. 2, several additional features related to the engine combustion chamber are of importance in quantifying the design of the exemplary embodiment disclosed herein. The cylinder 14 has an axis 56 extending through the combustion chamber 16.

Also, the fuel injector 38 has a spray tip 58 located in the combustion chamber 16 at the closed end of the cylinder 14 and slightly offset to one side 60 of the cylinder axis 56. The spray tip 58 forms a generally conical fuel spray 62 centered about an injector centerline 63 which may be formed conventionally by a swirl nozzle or by a plurality of orifices in the tip capable of injecting separate fuel streams arranged in a conical pattern. The spark plug 40 has a centerline 64 which extends along a center electrode. A spark gap 66 on the centerline 64 protrudes into the combustion chamber from the closed cylinder end and is offset slightly from the cylinder axis on a side 68 opposite from the injector spray tip.

The piston 12 includes a generally flat rim 70 having an inner edge 72 surrounding a recessed bowl 74 into which the fuel is primarily injected. The bowl has a floor 76 and a surrounding side 78 formed primarily by an arcuate or curved surface 80 connecting tangentially with the floor 76 and extending to the rim inner edge 72.

Figure 3:
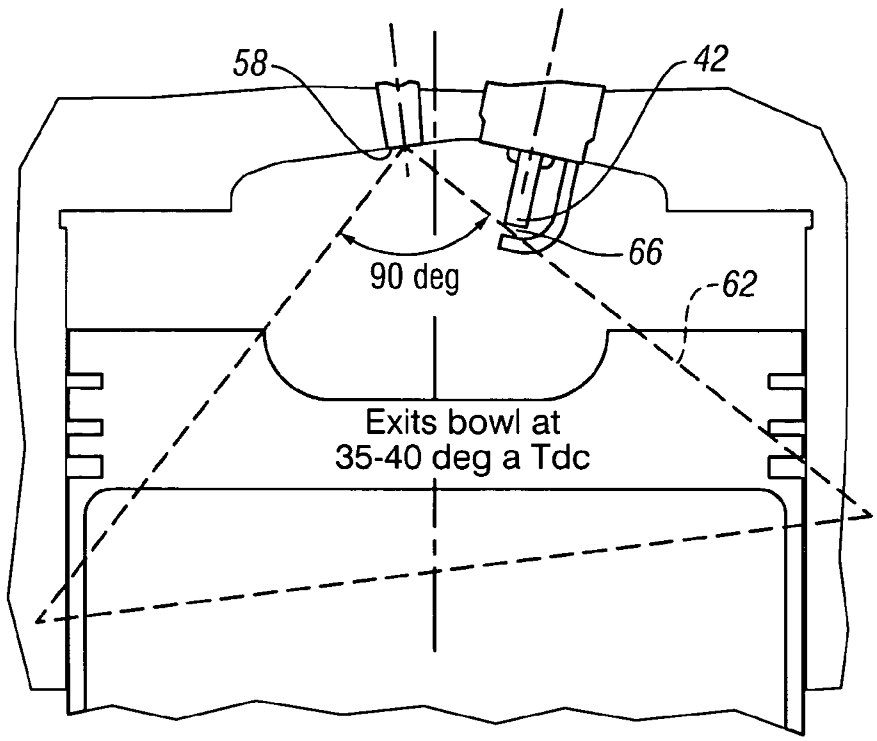
FIGS. 3 and 4 are schematic illustrations of piston bowl/injector matching for spray cone angles of 90 and 60 degrees, respectively.
Figure 4:
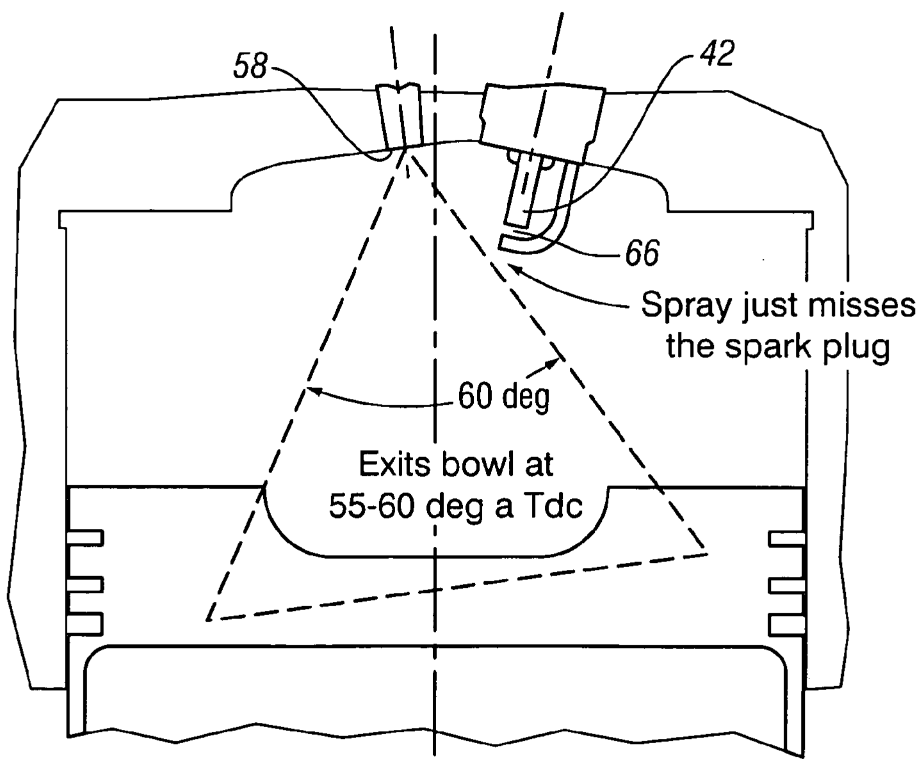

With continued reference to FIG. 2, the combustion chamber configuration is modified to accommodate engine packaging, in that both injector and spark plug centerlines 63, 64 may be inclined as shown. With the specified injector and spark plug inclination angles, a unique relationship between spark plug gap 66 protrusion 42 and spray cone 62 angle 44 can be determined. For example, a spray cone angle of 90 degrees will intersect the spark gap 66 if a spark plug 40 with 9 mm protrusion 42 is used (FIG. 3). The distance 46 (FIG. 2) between the injector spray tip 58 and the spark gap 66 is then determined. A spray cone angle of 60 degrees misses the same spark plug gap 66 on the low side as expected (FIG. 4). This type of spark ignition process is sometimes called spray-guided ignition.

Another type of ignition process, called wall-controlled ignition, is used in many production gasoline direct injection engines with combustion chambers similar to that described in patent U.S. Pat. No. 6,494,178, assigned to the assignee of the present invention. These include a piston bowl design for a gasoline direct-injection engine that has a transporting surface which directs a fuel-air charge from the bowl volume toward the spark plug gap. Several design features described in U.S. Pat. No. 6,494,178 were incorporated in the present invention. These include the piston bowl corner radius 48 and distance 50 between spark plug ground electrode and piston bowl surface. The piston bowl diameter 52 and its depth 54 were then determined based on the compression ratio requirement.

Figure 2A:
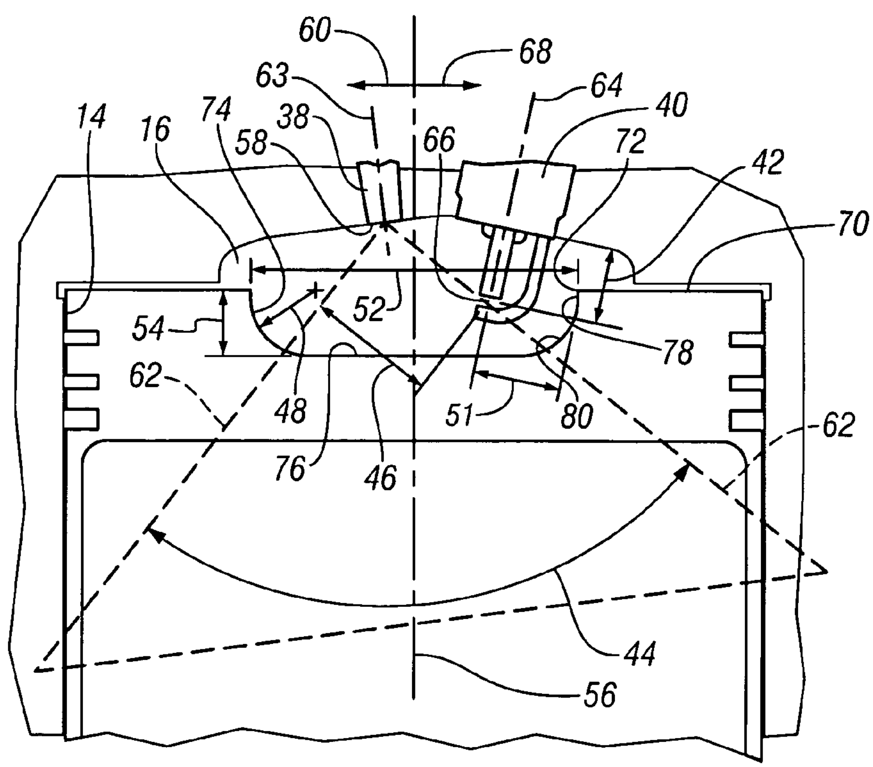
FIG. 2A is similar to FIG. 2 except for an altered dimensional selection.

FIG. 2A slightly modifies the presentation of the identical arrangement shown in FIG. 2. Reference numerals of FIG. 2 corresponding to the features of FIG. 2A are as follows:

- 58—injector tip;
- 40—spark plug;
- 42—plug protrusion;
- 44—spray cone angle;
- 46—distance—injector tip to spark plug gap;
- 48—bowl corner radius (arcuate surface);
- 50—distance from ground electrode to bowl (FIG. 2);
- 51—distance from centerline of spark plug to bowl side (curved surface—FIG. 2A);
- 52—bowl diameter;
- 54—bowl depth.

Test results have shown that the operating range of controlled auto-ignition combustion is affected by the combination of bowl diameter 52 and spray cone angle 44. In particular, it is confirmed experimentally that the most advanced end of injection timing allowed is about 40 degrees BTDC for the 90 degree spray cone angle injector and about 60 degrees BTDC for the 60 degree spray cone angle injector. This is because the spray starts to exit the piston bowl at the indicated crank angle positions (FIGS. 3 and 4). Further injection timing advance can result in increased exhaust emissions and decrease in fuel economy.

Figure 5:
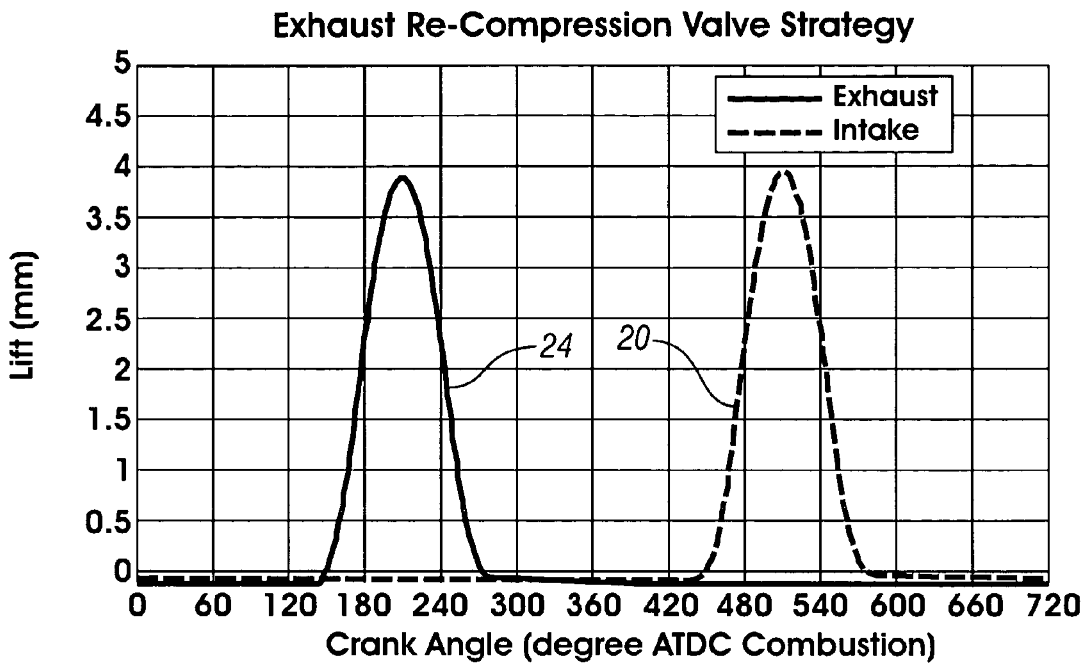
FIG. 5 is a diagram of the intake and exhaust valve lift profiles as a function of crank angle used in obtaining reported test results.

FIG. 5 illustrates the lift curves of the intake valve 20 and exhaust valve 24, in accordance with the present invention, for a controlled auto-ignition combustion engine during cold start and in low load operation with the use of a fully flexible valve actuation (FFVA) system. As tested, the intake valve 20 and exhaust valve 24 are electro-hydraulically actuated, however, they could be actuated mechanically, or electrically using electromagnetic force.

In FIG. 5, the exhaust valve 24 opens at approximately 30 degrees before bottom dead center in the expansion stroke (150 degrees ATDC in the diagram) and closes at approximately 90 degrees before top dead center in the exhaust stroke (270 degrees ATDC in the diagram). The intake valve 20 is opened later in the engine cycle than a normal spark ignition engine, at approximately 90 degrees after top dead center in the intake stroke (450 degrees ATDC in the diagram) and closes at approximately 30 degrees after bottom dead center in the compression stroke (570 degrees ATDC in the diagram).

The early exhaust valve closing and late intake valve opening provide a negative valve overlap period of about 180 degrees (during the last half of the exhaust stroke and the first half of the intake stroke) where both exhaust and intake valves are closed. This traps in the cylinder a large portion of the combusted gas which, upon opening of the intake valve, mixes with the fuel/air charge inducted during the intake stroke. The hot gases mixing with the fresh charge greatly increase the charge temperature and thereby promote the auto-ignition process FIGS. 6 and 7 illustrate the influence of spark ignition on combustion in the engine. The engine operating condition corresponds to an engine load of 135 kPa NMEP and a speed of 1000 rpm using split fuel injection with 1 mg prior to the intake stroke (end of injection (EOI) 1=380 degrees BTDC combustion) and 5 mg during late compression stroke (EOI 2=50 degrees BTDC).

FIG. 6 is a plot of 50% mass fraction of fuel burned (CA50) in relation to 10% mass fraction of fuel burned (CA10) as determined from individual cycle heat release analyses. For the data shown in FIG. 6, the engine was operated without spark assist and is pure HCCI. There is a one-to-one relationship between the CA50 and the CA10 burn locations. The line in the figure is a polynomial curve fit through the data. At this operating condition there is a 7 degree crank angle spread in the ignition timing, which results in the same spread in CA50 timing. All of the changes in combustion phasing can be related back to changes in ignition timing.

For the data displayed in FIG. 7 the engine was operated at the same condition but the spark was turned on. The data is divided into two distinct groups: one is composed of those cycles that had pure HCCI combustion and another with spark-assisted auto-ignition. For those cycles where the spark has an effect the CA10 timing is advanced on average by 10 degrees from the pure HCCI cycles. For the spark-assisted group there is no clear relationship between CA10 and CA50 locations. Rather, the combustion phasings are randomly distributed over a narrow window of crank angles.

Another interesting feature is that the CA50 location for spark-assisted HCCI is retarded relative to that which would have existed if the cycle had been a pure HCCI cycle. Since the spark has the ability to advance the ignition phasing relative to that of pure HCCI, this means that less aggressive re-compression valve timings can be used to obtain the same combustion phasing. The reduction in re-compression results in a corresponding reduction in pumping work that results in improved fuel efficiency. Thus, spark-assisted HCCI results in both the ability to have active combustion phasing control, particularly at low load, as well as improved fuel efficiency due to a reduction in the re-compression pumping work.

FIG. 8 shows 3-D (perspective view) and 2-D (top view) contour plots of the location of peak pressure (LPP) versus spark and injection timings using an 80 degree swirl injector. The engine operating condition corresponds to an engine load of 135 kPa NMEP and a speed of 1000 rpm using split fuel injection with 1 mg during early intake stroke (EOI_1=359 degrees BTDC) and 5 mg during late compression stroke (EOI_2). The test was conducted by recording the location of peak pressure with variations in spark timing (advance) (SA) at a fixed value of EOI_2 injection timing. The LPP with pure HCCI operation is also plotted as indicated using no spark on the SA axis.

The results clearly show the existence of two distinct regions where the LPP is affected by spark ignition. The region labeled as spray-guided ignition region shows a close relationship between SA and EOI_2 similar to that of the spray-guided combustion system for a gasoline direct injection engine. The region labeled as wall-controlled ignition region shows about 25–30 crank angle degrees separation between SA and EOI_2 similar to that of the wall-controlled combustion system for a gasoline direct injection engine.

Similar tests were done with multi-hole injectors as shown in FIG. 9. The engine operating condition corresponds to an engine load of 135 kPa NMEP and a speed of 1000 rpm using split fuel injection with 1 mg prior to the intake stroke (EOI 1=380 degrees BTDC combustion) and 5 mg during late compression stroke (EOI 2) The figure shows 2-D (top view) contours plots of the location of peak pressure (LPP) versus spark and injection timings with the 60 and 90 degree multi-hole injectors. It is clear from the data illustrated in the figure that the 60 degree multi-hole injector produces both spray-guided and wall-controlled ignition regions similar to those of the 80 degree swirl injector (FIG. 8).

The spray-guided ignition region is less clear than the 80 degree swirl injector due to the slight mismatch between the fuel spray and the spark gap shown in FIG. 4. For the 90 degree multi-hole injector, however, only the spray-guided ignition region is visible because the controlled auto-ignition combustion deteriorated noticeably when the end of injection timing advanced beyond 40 degrees BTDC due to spray exiting the piston bowl (FIG. 3). The multi-hole injectors used in the tests all have 8 holes with equal spacing between holes. It was confirmed experimentally that engine combustion is quite insensitive to injector rotation and therefore, spray to spark gap targeting in accordance with the present invention.

Based on results presented in FIGS. 8 and 9, an optimal spray cone angle for the combustion system of the present invention is about 70–80 degrees for swirl injectors and 60–70 degrees for multi-hole injectors. With the present invention, cold start of a controlled auto-ignition combustion engine is demonstrated using the exhaust re-compression valve strategy. A fuel injection strategy with split fuel injection that involves a 2 mg fuel injection during late exhaust stroke and a 9 mg fuel injection during late compression stroke is capable of starting the engine at room temperature using a conventional compression ratio. The engine was operated with unheated coolant and oil.

FIG. 10 plots the measured NMEP (net mean effective pressure) versus the cycle number during engine startup. The engine operating condition corresponds to an engine load of 270 kPa NMEP and a speed of 1000 rpm using split fuel injection with 2 mg prior to the intake stroke (EOI 1=400 degrees BTDC) and 9 mg during late compression stroke (EOI 2=67 degrees BTDC). It is clear from the figure that once the engine started, constant engine load was reached within a few engine cycles. Further, the start-up process is quite repeatable as demonstrated also in FIG. 10 with results taken on different days.

As a side note, in both spark ignition and diesel engines, the burned gas temperature is highly heterogeneous within the mixture with very high local temperatures creating high NOx emissions. With the present invention, using split injection with the second injection during late compression stroke could potentially increase charge heterogeneity and increase NOx emissions. With the present invention, however, we have wide enough spark and injection authorities (see FIGS. 8 and 9) such that NOx emissions can be controlled by simply re-optimization of the spark timing, second fuel injection timing and fuel mass.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A combustion chamber for an internal combustion engine comprising:

a closed end cylinder having an inlet port and an exhaust port formed therein with valve members disposed in the ports for controlling the flow of air and products of combustion to and from the combustion chamber, a gasoline fuel injector having a spray tip and a spark ignition source having a spark gap, the cylinder having an axis and positioned to receive air and fuel injected directly from the fuel injector; and a piston mounted for reciprocation in the cylinder, the piston including a generally flat rim having an inner edge surrounding a recessed bowl into which the fuel is primarily injected, the bowl having a floor and a surrounding side formed by an arcuate surface connecting tangentially with the floor and extending to the rim inner edge;

the spark plug having a centerline through the spark gap and being offset to one side of the cylinder axis with the spark gap extending into the combustion chamber toward the axis; and the injector being offset to an opposite side of the axis with the spray tip aimed to direct a generally conical fuel spray into the piston bowl with a portion of the fuel spray passing near the spark gap;

wherein the spark plug centerline is spaced inward from the bowl side arcuate surface by a minimum distance in a range of 6 to 10 mm.

2. A combustion chamber as in claim 1 including:

said arcuate surface having a radius in a range of three to twelve millimeters.

3. A combustion chamber as in claim 1 including:

said piston bowl being generally circular and the volume of the bowl being determined by a prescribed compression ratio of the combustion chamber.

4. A combustion chamber as in claim 1 including:

said spray tip forming a spray cone angle in a range of 50 to 90 degrees.

5. A combustion chamber as in claim 1 including:

said spark gap being spaced a dimension in a range of 10 to 20 mm from the injector tip.

6. A combustion chamber as in claim 1 including:

said spark gap extending a dimension in a range of 3 to 9 mm into the combustion chamber.

7. A combustion chamber as in claim 1 including:

the valve members being controllable for variable timing in a range from a normal amount of valve overlap to a substantial amount of negative overlap.

8. A combustion chamber as in claim 1 wherein the inner edge of the piston rim defines an outer circumference of the recessed bowl.

9. A combustion chamber as in claim 8 wherein the recessed bowl is generally centered on said cylinder axis.

10. A combustion chamber as in claim 9 wherein the spark gap and the injector are both positioned near the cylinder axis with the spark gap located below the injector and at least near the path of the conical fuel spray.

11. A combustion chamber as in claim 10 wherein said portion of the fuel spray passes at least closely adjacent to the spark gap.

* * * * *